No. 839,981.    PATENTED JAN. 1, 1907.
W. H. BRISTOL.
PRESSURE INDICATOR AND RECORDER.
APPLICATION FILED MAR. 18, 1905.

Witnesses
C. W. Thomas.
Geo. W. Eisenhauer

William H. Bristol Inventor
By His Attorney Fred P. Schuster

UNITED STATES PATENT OFFICE.

WILLIAM H. BRISTOL, OF NEW YORK, N. Y.

PRESSURE INDICATOR AND RECORDER.

No. 839,981.

Specification of Letters Patent.

Patented Jan. 1, 1907.

Application filed March 18, 1905. Serial No. 250,744.

*To all whom it may concern:*

Be it known that I, WILLIAM H. BRISTOL, a citizen of the United States of America, residing at New York, in the county of New York and State of New York, have invented certain new and useful Improvements in Pressure Indicators and Recorders, of which the following is a specification.

My invention relates to improvements in devices for indicating or recording pressures or variations thereof, and particularly to that class of pressure indicating or recording devices in which the elongation or expansion of an expansible chamber is converted into a deflection, serving to indicate the existing pressure by suitably restraining the motion of said chamber.

My present invention is an improvement on my former invention patented February 4, 1890, No. 420,570, and has for its object to give greater freedom of movement to such devices, to decrease the length of chamber, to prevent lag, to insure prompt return on decrease in pressure, and to permit of a diversity of scales.

For this purpose my invention consists, essentially, of an expansible chamber which is constrained to a definite direction of motion by two flexible restraining-springs placed at right angles to the plane of motion and rigidly connected to the top and bottom of said chamber in such a manner that their plane is parallel to or inclined to the axis of normal expansion of said chamber.

My invention will best be understood when described in connection with the following drawings, in which—

Figure 1:
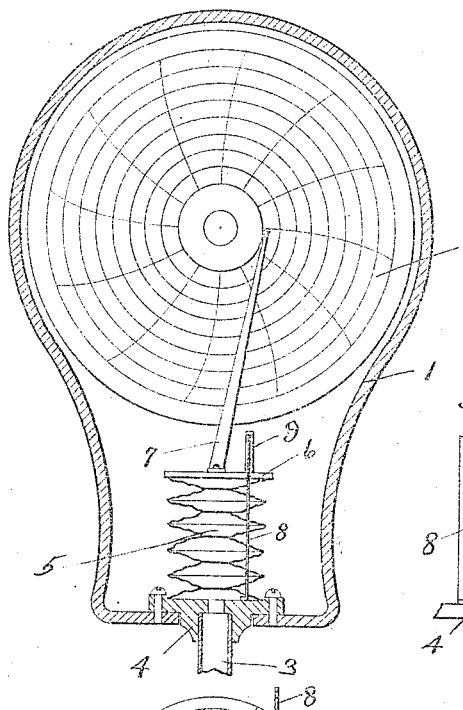
Figure 3:
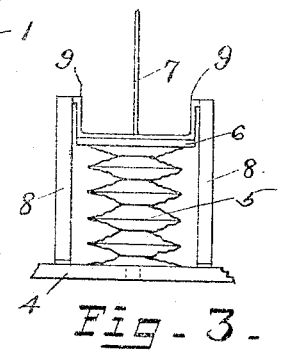
Figure 2:
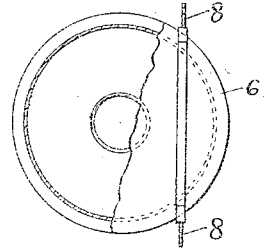

Figure 1 illustrates the application of my invention to a recording device. Fig. 2 is an enlarged cross-sectional view. Fig. 3 is a side view. Figs. 4 to 7 are views showing modifications.

Similar numerals of reference designate corresponding parts throughout the several views.

Referring now to the drawings, 1 is a case of any suitable indicating or recording mechanism, provided with a dial 2, upon which the continuous record of the pressure is made.

3 is a connecting-pipe through which the pressure to be measured is brought to the instrument.

Figure 4:
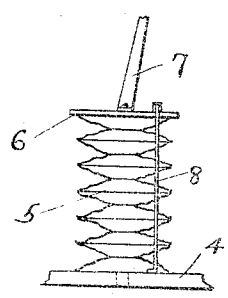
Figure 5:
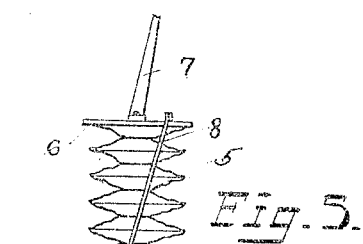
Figure 7:
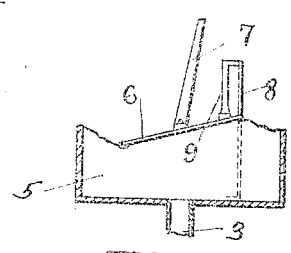
Figure 6:
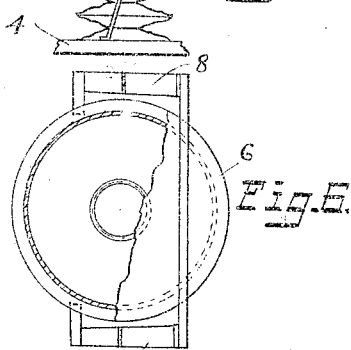

4 is a perforated head secured to the pipe 3 and to the case and adapted to form one end of the expansible chamber 5. This expansible chamber is closed at the top and has a non-flexible plate 6, to which is attached the pointer 7, which indicates or records the pressure existing in the chamber 5. This chamber may be composed of a series of sections of perforated diaphragms, either plain or corrugated, as shown in Figs. 1 to 5, or it may consist of a single expansible section, as shown in Fig. 7, the plate 6 being connected to the rigid sides of the chamber by some flexible material, such as rubber, leather, &c. Internal pressure applied to the chamber 5 will cause it to expand. To utilize this expansion for the purpose of measuring the pressure, I provide two flexible restraining-springs, such as the two strips or two resilient wires 8, which are rigidly connected to the bottom of said chamber and to vertical projections 9 at the top of said chamber, as shown in Figs. 1, 2, 3, and 7. These strips are so disposed that their plane is either parallel to the axis of normal expansion of the chamber, as shown in Figs. 1, 2, 3, 4, and 7, or inclined to it, as shown in Figs. 5 and 6. In Figs. 4 to 6 I have shown this strip rigidly connected to the top of the chamber instead of to a projecting arm 9, Figs 1, 2, 3, and 7. By thus shortening the strip the freedom of motion is somewhat impaired, but is nevertheless much better than the motion obtained in the older style of instruments.

By varying the flexibility of the restraining springs or strips, as by altering their form, cross-section, or width, I am enabled to obtain a great diversity of deflections and have also found it possible by this means to obtain a substantially uniform scale for unit changes of pressure. In Fig. 6 I have shown the width of the strips 8 tapered toward the bottom, thereby imparting greater flexibility to the lower part of the strips than to the upper part. I may also obtain a diversity of scales by fastening the strips at various places—as, for example, as indicated in Fig. 5. The particular manner of attaching the springs as herein set forth causes them to return the chamber on decrease in pressure therein and also to definitely determine the zero position of the pointer. To further secure a fixed zero position, I may place a slight initial tension on the chamber in fastening the springs.

What I claim as new, and desire to secure by Letters Patent, is—

1. In a pressure indicator or recorder; the combination with an expansible chamber, of two flexible restraining-springs placed edgewise with respect to said chamber and rigidly secured only at the top and bottom of said chamber and otherwise free and clear thereof, and adapted to convert the expansion of the said chamber into a deflection, said springs having the planes of their side faces in common planes at right angles to the plane of deflection of the axis of said expansible chamber.

2. In a pressure indicator or recorder; the combination with an expansible chamber, an indicating-arm attached to said chamber, of two flexible restraining-springs placed edgewise with respect to said chamber and rigidly secured only at the top and bottom of said chamber and otherwise free and clear thereof, and adapted to convert the expansion of the said chamber into a deflection, said springs having the planes of their side faces in common planes at right angles to the plane of deflection of the axis of said expansible chamber.

3. In a pressure indicator or recorder; the combination with an expansible chamber, of two flexible restraining-springs of variable cross-section rigidly secured to the top and bottom of said chamber, but otherwise free and clear thereof, and adapted to convert the expansion of said chamber into a deflection, said springs having the planes of their side faces in common planes at right angles to the plane of deflection of the axis of said chamber.

4. In a pressure indicator or recorder; the combination with an expansible chamber, an indicating-arm attached to said chamber, of two flexible restraining-springs of variable cross-section rigidly secured to the top and bottom of said chamber, but otherwise free and clear thereof, and adapted to convert the expansion of said chamber into a deflection, said springs having the planes of their side faces in common planes at right angles to the plane of deflection of the axis of said chamber.

5. In a pressure indicator or recorder; the combination with an expansible chamber composed of a series of perforated disks, of two flexible restraining-springs placed edgewise with respect to said chamber and rigidly secured only at the top and bottom of said chamber and otherwise free and clear thereof, and adapted to convert the expansion of said chamber into a deflection, said springs having the planes of their side faces in common planes at right angles to the plane of deflection of the axis of said expansible chamber.

6. In a pressure indicator or recorder; the combination with an expansible chamber, composed of a series of perforated disks, and two flexible restraining-springs of variable cross-section placed edgewise with respect to said chamber and rigidly secured only at the top and bottom of said chamber and otherwise free and clear thereof and adapted to convert the expansion of said chamber into a deflection, said springs having the planes of their side faces in common planes at right angles to the plane of deflection of the axis of said expansible chamber.

7. In a pressure indicator or recorder; the combination with an expansible chamber, of two flexible flat restraining-springs placed edgewise with respect to said chamber and rigidly secured to the top and bottom of said chamber but otherwise free and clear thereof, and adapted to convert the expansion of the said chamber into a deflection, said springs having the planes of their side faces in common planes at right angles to the plane of deflection of the axis of said expansible chamber.

8. In a pressure indicator or recorder; the combination with an expansible chamber, an indicating-arm attached to said chamber, of two flexible flat restraining-springs placed edgewise with respect to said chamber and rigidly secured to the top and bottom of said chamber but otherwise free and clear thereof and adapted to convert the expansion of the said chamber into a deflection, said springs having the planes of their side faces in common planes at right angles to the plane of deflection of the axis of said expansible chamber.

9. In a pressure indicator or recorder; the combination with an expansible chamber, of two flexible flat restraining-springs of variable cross-section rigidly secured to the top and bottom of said chamber, but otherwise free and clear thereof, and adapted to convert the expansion of said chamber into a deflection, said springs having the planes of their side faces in common planes at right angles to the plane of deflection of the axis of said chamber.

10. In a pressure indicator or recorder; the combination with an expansible chamber, an indicating-arm attached to said chamber, of two flexible flat restraining-springs of variable cross-section rigidly secured to the top and bottom of said chamber, but otherwise free and clear thereof, and adapted to convert the expansion of said chamber into a deflection, said springs having the planes of their side faces in common planes at right angles to the plane of deflection of the axis of said chamber.

11. In a pressure indicator or recorder; the combination with an expansible chamber composed of a series of perforated disks, of two flexible flat restraining-springs placed edgewise with respect to said chamber and rigidly secured to the top and bottom of said chamber, but otherwise free and clear thereof and adapted to convert the expansion of said chamber into a deflection, said springs having the planes of their side faces in common planes at right angles to the plane of deflection of the axis of said expansible chamber.

12. In a pressure indicator or recorder; the combination with an expansible chamber, composed of a series of perforated disks, and two flexible flat restraining-springs of variable cross-section rigidly secured to the top and bottom of said chamber but otherwise free and clear thereof and adapted to convert the expansion of said chamber into a deflection, said springs having the planes of their side faces in common planes at right angles to the plane of deflection of the axis of said expansible chamber.

In testimony whereof I have signed my name to this specification, in the presence of two subscribing witnesses, this 16th day of March, 1905.

WILLIAM H. BRISTOL.

Witnesses:
A. FABER DU FAUR,
RAENA H. YUDIZKY.